(12) United States Patent
Nanjappan

(10) Patent No.: US 10,414,629 B2
(45) Date of Patent: Sep. 17, 2019

(54) MECHANICAL SYSTEM SERVICE TOOL

(71) Applicant: Otis Elevator Company, Farmington, CT (US)

(72) Inventor: Ezhil Nanjappan, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 15/876,941

(22) Filed: Jan. 22, 2018

(65) Prior Publication Data

US 2019/0225458 A1 Jul. 25, 2019

(51) Int. Cl.
*H04W 4/02* (2018.01)
*B66B 5/00* (2006.01)
*B66B 1/34* (2006.01)
*H04M 1/725* (2006.01)

(52) U.S. Cl.
CPC .......... *B66B 5/0025* (2013.01); *B66B 1/3461* (2013.01); *B66B 5/0087* (2013.01); *H04M 1/72527* (2013.01); *H04M 1/72563* (2013.01)

(58) Field of Classification Search
CPC ... B66B 5/0025; B66B 5/0087; B66B 1/3461; H04M 1/72527; H04M 1/72563
See application file for complete search history.

(56) References Cited

U.S. PATENT DOCUMENTS

| | | |
|---|---|---|
| 6,959,235 B1 | 10/2005 | Abdel-Malek et al. |
| 7,002,462 B2 | 2/2006 | Welch |
| 7,027,808 B2 | 4/2006 | Wesby |
| 7,073,633 B2 | 7/2006 | Weinberger et al. |
| 7,172,055 B2 | 2/2007 | Engel et al. |
| 7,448,473 B2 | 11/2008 | Lindberg et al. |
| 8,069,958 B2 | 12/2011 | Lence-Barreiro |
| 8,418,815 B2 | 4/2013 | Encinas Carreno et al. |
| 8,540,057 B2 | 9/2013 | Schuster et al. |
| 9,108,824 B2 | 8/2015 | Hughes et al. |

(Continued)

FOREIGN PATENT DOCUMENTS

| | | |
|---|---|---|
| CN | 202512720 | 10/2012 |
| CN | 102807145 A | 12/2012 |

(Continued)

OTHER PUBLICATIONS

Qameleon, "QarVision RP", available at: http://www.qameleon.com/protected/QVRP_install.htm, accessed: Apr. 19, 2019, 1 page.

(Continued)

*Primary Examiner* — Chuong A Ngo
(74) *Attorney, Agent, or Firm* — Cantor Colburn LLP

(57) ABSTRACT

A service tool is provided. The service tool includes a transceiver communicatively coupled to a wireless access device physically connected to a mechanical system. The service tool includes a memory storing a service tool application software thereon. The service tool includes a processor executing the service tool application software to execute at least one of a plurality of operability support levels by the service tool for the mechanical system. The plurality of operability support levels includes an adjuster/construction level. The adjuster/construction level includes security provisions for control of the mechanical system.

14 Claims, 3 Drawing Sheets

(56) References Cited

U.S. PATENT DOCUMENTS

| | | | |
|---|---|---|---|
| 9,349,282 B2 | 5/2016 | Luna et al. | |
| 9,580,276 B2 | 2/2017 | Toutaoui | |
| 9,734,693 B2 | 8/2017 | McKinley et al. | |
| 9,747,585 B2 | 8/2017 | Eleid et al. | |
| 2015/0066782 A1 | 3/2015 | Vainberg et al. | |
| 2015/0251875 A1* | 9/2015 | Lustenberger | B66B 5/0031 |
| | | | 700/275 |
| 2015/0256665 A1* | 9/2015 | Pera | H04L 12/2803 |
| | | | 455/420 |
| 2016/0134686 A1* | 5/2016 | Youker | H04L 47/823 |
| | | | 709/217 |
| 2017/0029244 A1 | 2/2017 | Madarasz et al. | |

FOREIGN PATENT DOCUMENTS

| | | |
|---|---|---|
| CN | 203255824 | 10/2013 |
| CN | 103449267 | 12/2013 |
| CN | 203439860 U | 2/2014 |
| CN | 104044969 | 9/2014 |
| CN | 104229577 | 12/2014 |
| CN | 204569041 | 8/2015 |
| CN | 104944240 A | 9/2015 |
| CN | 103950806 B | 6/2016 |
| CN | 106829668 | 6/2017 |
| CN | 107257770 | 10/2017 |
| EP | 3124418 A2 | 2/2017 |
| EP | 3030509 | 9/2017 |
| EP | 3435268 A1 | 1/2019 |
| WO | 2016091309 A1 | 6/2016 |

OTHER PUBLICATIONS

Todair, "Elevator Wireless Monitoring", available at: http://www.todaair.com/elevator-wireless-monitoring/, accessed Apr. 19, 2019, 5 pages.

European Search Report for application 19152750.6, dated Jun. 21, 2019, 8 pages.

* cited by examiner

MECHANICAL SYSTEM SERVICE TOOL

BACKGROUND

Technicians typically utilize a conventional service device, at present, to configure and service an elevator system. The conventional service device is a single use, single purpose device that can typically only perform direct operation checks of the elevator controller. To perform direct operation checks, the conventional service device must be connected via a serial cable to the elevator controller.

Technicians may carry and utilize, with the conventional service device, a dongle to perform advanced operational configuration changes to the elevator controller. The dongle enables through hardwiring (must be physically connected between the serial cable and the elevator controller) the advanced operational configuration change capabilities for the conventional service device. Not only is the dongle expensive to make, but if the technician does not possess one while on-site then that technician will be unable to fully service the elevator controller.

BRIEF DESCRIPTION

In accordance with one or more embodiments, a service tool is provided. The service tool includes a transceiver communicatively coupled to a wireless access device physically connected to a mechanical system. The service tool includes a memory storing a service tool application software thereon. The service tool includes a processor executing the service tool application software to execute at least one of a plurality of operability support levels by the service tool for the mechanical system. The plurality of operability support levels includes an adjuster/construction level. The adjuster/construction level includes security provisions for control of the mechanical system.

In accordance with one or more embodiments or the service tool embodiment above, the transceiver can be communicatively coupled to a cloud service to provide the security provisions for the adjuster/construction level.

In accordance with one or more embodiments or any of the service tool embodiments above, the security provisions can include online authentication, dual factor authentication, session management, counter per session, application sign-in, certificates, obfuscation, or mobile device management.

In accordance with one or more embodiments or any of the service tool embodiments above, the cloud service can provide to the service tool a remote service functionality including encoding, multi-level security, counter based access, or time based access.

In accordance with one or more embodiments or any of the service tool embodiments above, the adjuster/construction level can include checking drive and group status, performing a remote station link address check, performing a contract and/or default setups, and performing a search of input/outputs.

In accordance with one or more embodiments or any of the service tool embodiments above, the plurality of operability support levels can include a field technician level including detecting, monitoring, and analyzing provisions of the mechanical system for an elevator car or escalator direction, an elevator car or escalator position, an up/down status, a load status, an operational mode, and an input/output status.

In accordance with one or more embodiments or any of the service tool embodiments above, the mechanical system can include an elevator or escalator controller and/or each of the plurality of operability support levels can comprise one or more of logging, searching, offline, safety, shortcut, and statistic features.

In accordance with one or more embodiments or any of the service tool embodiments above, the security provisions with respect to the adjuster/construction level can enable the service tool to provide direct operation checks and advanced operational configuration changes to the mechanical system independent of a proprietary dongle.

In accordance with one or more embodiments or any of the service tool embodiments above, the wireless access device can be physically and electrically coupled to an interface of the mechanical system, the interface can include a nine-pin serial port.

In accordance with one or more embodiments or any of the service tool embodiments above, the service tool can be a smartphone.

In accordance with one or more embodiments, a system is provided. The system includes a mechanical system operating and managing an elevator or an escalator. The system includes a wireless access device physically connected to the mechanical system. The system includes a service tool. The service tool includes a transceiver communicatively coupled to the wireless access device. The service tool includes a memory storing a service tool application software thereon. The service tool includes a processor executing the service tool application software to execute at least one of a plurality of operability support levels by the service tool for the mechanical system. The plurality of operability support levels include an adjuster/construction level including security provisions for control of the mechanical system.

In accordance with one or more embodiments or the system embodiment above, the transceiver can be communicatively coupled to a cloud service to provide the security provisions for the adjuster/construction level.

In accordance with one or more embodiments or any of the system embodiments above, the security provisions can include online authentication, dual factor authentication, session management, counter per session, application sign-in, certificates, obfuscation, or mobile device management.

In accordance with one or more embodiments or any of the system embodiments above, the cloud service can provide to the service tool a remote service functionality including encoding, multi-level security, counter based access, or time based access.

In accordance with one or more embodiments or any of the system embodiments above, the adjuster/construction level can include checking drive and group status, performing a remote station link address check, performing a contract and/or default setups, and performing a search of input/outputs.

In accordance with one or more embodiments or any of the system embodiments above, the plurality of operability support levels can include a field technician level including detecting, monitoring, and analyzing provisions of the mechanical system for an elevator car or escalator direction, an elevator car or escalator position, an up/down status, a load status, an operational mode, and an input/output status.

In accordance with one or more embodiments or any of the system embodiments above, the mechanical system can include an elevator or escalator controller and/or each of the plurality of operability support levels can comprise one or more of logging, searching, offline, safety, shortcut, and statistic features.

In accordance with one or more embodiments or any of the system embodiments above, the security provisions with respect to the adjuster/construction level can enable the service tool to provide direct operation checks and advanced operational configuration changes to the mechanical system independent of a proprietary dongle.

In accordance with one or more embodiments or any of the system embodiments above, the wireless access device can be physically and electrically coupled to an interface of the mechanical system, the interface can include a nine-pin serial port.

In accordance with one or more embodiments or any of the system embodiments above, the service tool can be a smartphone.

BRIEF DESCRIPTION OF THE DRAWINGS

The following descriptions should not be considered limiting in any way.

DETAILED DESCRIPTION

Embodiments herein relate to a service tool implemented on a mobile device, where the mobile device is communicatively coupled to a wireless access device that is physically coupled to or integrated an mechanical system The service tool supports enhanced security provisions that are otherwise not available on the conventional service device. In this regard, the enhanced security provisions allow the service tool to provide direct operation checks and advanced operational configuration changes (a technician regardless of whether they have the proprietary dongle).

Figure 1:
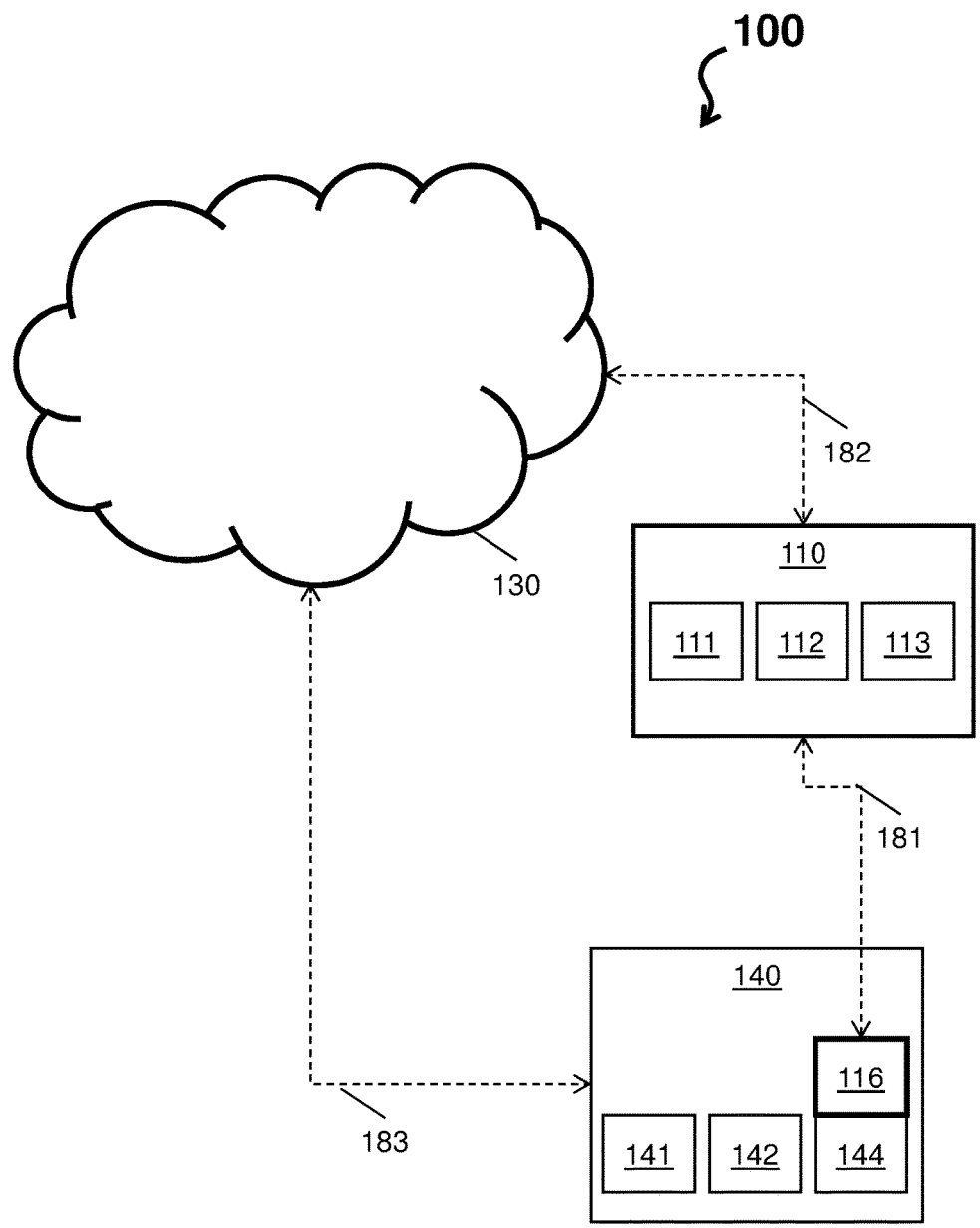
FIG. 1 depicts an elevator system comprising a service tool according to one or more embodiments.

Turning now to FIG. 1, a system 100 is depicted in accordance with one or more embodiments. As shown, the system 100 includes a service tool 110 comprising at least a processor 11, a memory 112, and a transceiver 113. The system 100 also includes a wireless access device 116 and a cloud service 130. The system 100 can interact with a controller 140 comprising at least a processor 141, a memory 142, and an interface 144. Communications between the components of FIG. 1 are represented by dashed arrows 181, 182, and 183.

The system 100 is an example and is not intended to suggest any limitation as to the scope of use or operability of embodiments described herein (indeed additional or alternative components and/or implementations may be used). Further, while single items are illustrated for items of the elevator system 100, these representations are not intended to be limiting and thus, any item may represent a plurality of items.

The service tool 110 is a computing device including any processing hardware (e.g., the processor 111 and the memory 112), software, or combination of hardware and software utilized to carry out computer readable program instructions (e.g., service tool application software). The processor 111 (also referred to as a processing circuit, microprocessor, microcontroller, etc.) can be coupled via a bus to the memory 112 and various other components. The memory 112 can include a read only memory (ROM) and/or a random access memory (RAM). The ROM is coupled to the bus and may include a basic input/output system (BIOS), which controls certain basic functions of the service tool 110. The RAM is read-write memory coupled to the bus for use by the processor 111.

The memory 112 of the service tool 110 is an example of a tangible storage medium readable, where the service tool application software is stored as the computer readable program instructions for execution by the processor 111. Examples of the service tool 110 can include any mobile device or smartphone with the service tool application software stored thereon. In accordance with one or more embodiments, the service tool application software supports enhanced security provisions that are otherwise not available on the conventional service device described herein. The enhanced security provisions include, but are not limited to, online authentication (OAUTH), dual factor authentication, session management, counter per session, application sign-in, certificates, obfuscation, and mobile device management (MDM).

The transceiver 113 of service tool 110 is a communications adapter and/or an interface adapter coupled to the bus. The transceiver 113 can communicate (e.g., via Bluetooth, Wi-Fi, or cellular communications, such as the communications 181 and 182) with the wireless access device 116, the cloud service 130, and/or devices and systems.

The service tool 110 connects to the cloud service 130 when implementing the enhanced security provisions. The cloud service 130 can be a computer, data server, and/or distributed computing system (e.g., a cloud based backend system) that stores software/firmware, along with provides remote services for the service tool 110 and the controller 140. In this regard and with respect to verifying the operability of the controller 140, the cloud service 130 can provide remote service functionality concerning verifying user credentials, serial numbers, product numbers, manufacturing dates, installations dates, installation locations, commission data, licensing terms, software versions, authentication requests, and the like. Examples of the remote service functionality also include, but are not limited to, encoding, multi-level security, counter based access, and time based access.

In accordance with one or more embodiments, the service tool 110 also connects to the wireless access device 116, which is physically and electrically coupled to the interface 144 of the controller 140. In general, the wireless access device 116 is a wireless access point for the service tool application software to verify operability of the controller 140. In turn, the service tool application software allows the service tool 110 to provide direct operations checks and advanced operational configuration changes to monitor and analyze a status, a behavior, and a performance of the controller 140.

The controller 140 is representative of a mechanical system and/or a controller within that mechanical system. In general, a mechanical system can be an elevator system comprising an elevator controller that controls an elevator and/or an escalator system comprising an escalator controller that control an escalator. The controller 140 can include any processing hardware (the processor 141 and the memory 142), software, or combination of hardware and software utilized by a mechanical system (e.g., elevator and/or escalator system) to carry out computer readable program instructions by performing arithmetical, logical, and/or input/output operations. The controller 140 can be considered the 'brain' of the mechanical system (which serves to operate and control positions, speeds, etc. of an elevator car and/or escalator belt). For instance, when a user submits a call to an elevator system, the controller 140 receives and processes the call to determine where and when to dispatch an elevator to pick-up and drop-off that user. The controller 140 can record, monitor, and/or store all operations of the elevator and/or escalator system. The controller 140 can comprise an interface 114, such as a nine-pin serial port, for receiving one or more components, such as the wireless access device 116.

In accordance with one or more embodiments, the service tool 110 and the service tool application software thereon provide multiple operability support levels for the controller 140. One level can include a field technician level where the service tool 110 can be utilized to detect, monitor, and analyze an elevator car number, an elevator car or escalator direction, an elevator car or escalator position, a door state, up/down status, a load status, an operational mode, download an error log, and an input/output (I/O) status. Another level can include an adjuster/construction level where the service tool 110 can be utilized to add security provisions for enhanced control of the controller 140. This enhanced control eliminates a proprietary dongle and includes the ability to check drive and group status, perform a remote station link (RSL) address check, perform a contract and/or default setups, perform a search of I/Os, and adjust various controller parameters, along with field technician level operations.

In accordance with one or more embodiments, each of the multiple operability support levels of the service tool 110 and the service tool application software can include logging, searching, offline, statistic, shortcut, and safety features. For example, the logging features can include when the service tool 110 downloads an error log from the controller 140 and communicates that error log to a remote system (e.g., for expert review), and the searching features can include when the service tool 110 receives a fault code and, in response, automatically executes a search for a description of that fault code.

Further, regarding the offline application feature, for example, because the service tool 110 can be a mobile device that is connected to the internet via a cellular network or the like, the service tool application can utilize its connection to provide additional services (such as communicating error logs). However, when the service tool 110 is not connected, the service tool application can provide can provide offline access to a number of features, such as the automatic execution of the search for fault code descriptions. The shortcut features can include shortcut buttons, icons, or the like within a user interface of the service tool application for diagnostics operations, and the statistic features can include the service tool application automatically measuring and storing application usage and adoption metrics, which can be communicated to a remote system (e.g., for expert review). Additionally, the safety feature can include when the service tool application provides safety notifications (e.g., popup windows) to alert technicians using the wireless access device 116. For instance, the safety features can provide a popup window on the service tool when using the service tool application and the wireless access device 116 to stay alert to the risks related to mobility (e.g., dragging, falling, electric shocks, etc.) and to keep a visual check on the operation of the mechanical system.

Figure 2:
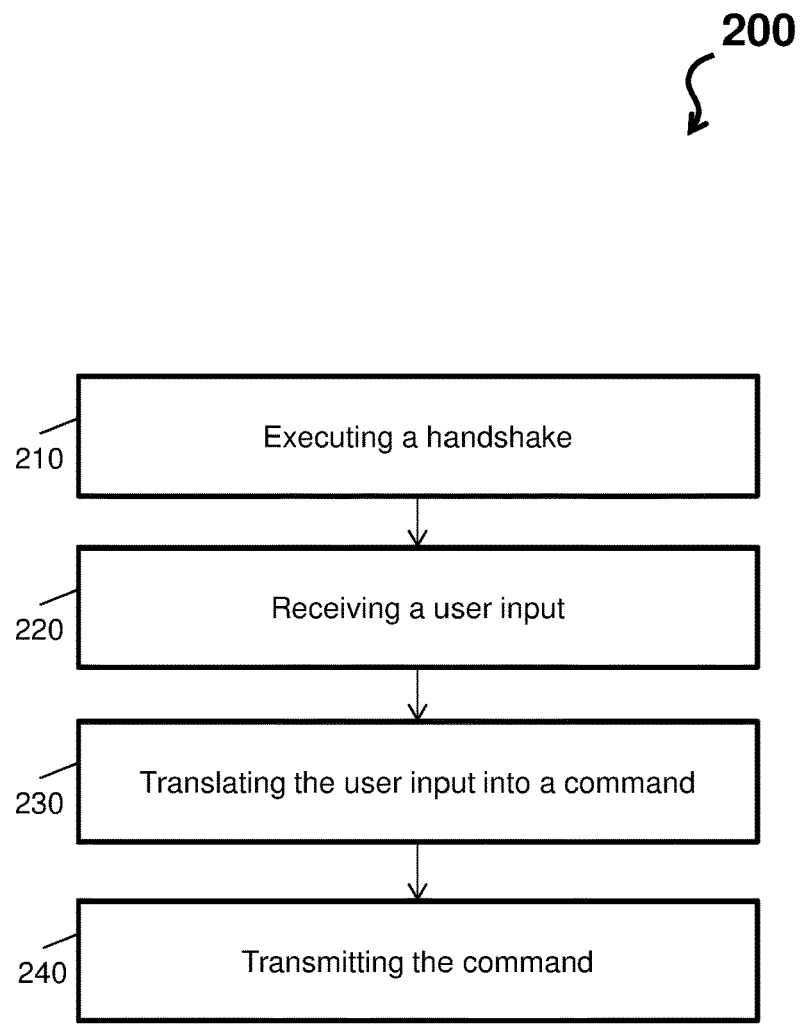
FIG. 2 depicts a process flow of a service tool according to one or more embodiments.

FIG. 2 depicts a process flow 200 of a service tool according to one or more embodiments. The process flow 200 generally relates to direct operations checks and will be described with reference to FIG. 1. The process flow 200 begins at block 210, where the service tool 110 of FIG. 1 executes a handshake. The handshake is an automated negotiation between the service tool 110 and the wireless access device 116 that dynamically sets parameters of a communications channel (i.e., communication 181) for subsequent transmission. For instance, the service tool 110 and the wireless access device 116 handshake to set up a Wi-Fi connection.

At block 220, the service tool 110 of FIG. 1 receives a user input. The user input can be received through a user interface of the service tool 110, e.g., entered by a user through a touch screen display or physical combination of buttons. The user input is an instruction to the service tool 110 to enable the field technician level.

At block 230, the service tool 110 of FIG. 1 translates the user input into a command. The command is transmittable by the service tool 110 and receivable by the controller 140. At block 240, the service tool 110 of FIG. 1 receives transmitting the command. The transceiver 113 of the service tool 110 transmits the command via the wireless access device 116 to the controller 140. In this regard, the controller 140 is aware and enabled to operate according to the field technician level.

Figure 3:
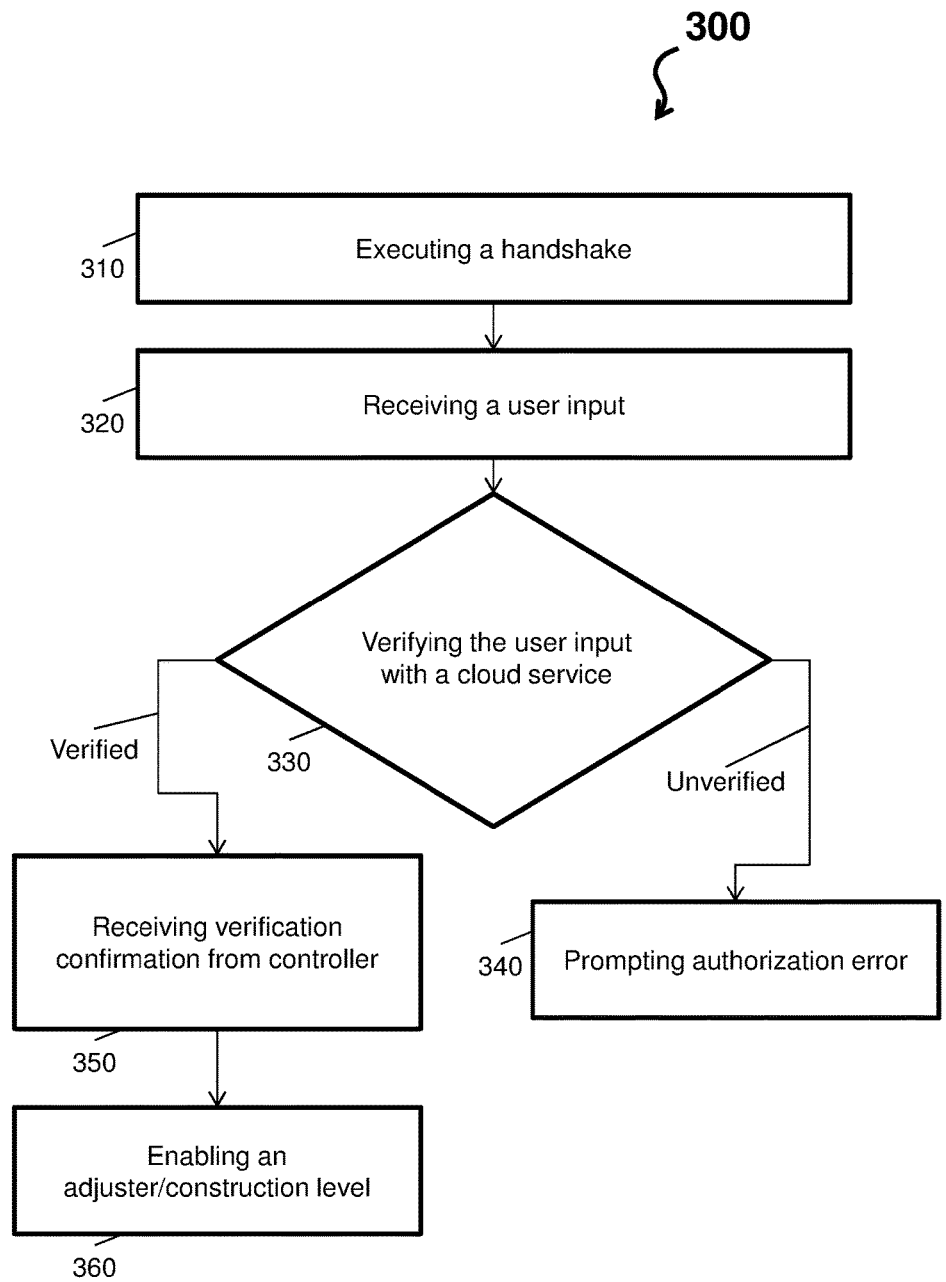
FIG. 3 depicts a process flow of a service tool according to one or more embodiments.

FIG. 3 depicts a process flow 300 of a service tool according to one or more embodiments. The process flow 300 generally relates to advanced operational configuration changes and will be described with reference to FIG. 1. The process flow 300 begins at block 310, where the service tool 110 of FIG. 1 executes a handshake (as described herein). At block 320, the service tool 110 of FIG. 1 receives a user input. The user input can be received through a user interface of the service tool 110, e.g., entered by a user through a touch screen display or physical combination of buttons. The user input is an instruction to the service tool 110 to enable the adjuster/construction level.

At decision block 330, the service tool 110 verifies the user input with the cloud service 130 (over communication 182). To verify the user input, the service tool 110 can utilize one or more enhanced security provisions. If the user input is not verified, the process flow 300 proceeds to block 340 as shown by the 'Unverified' arrow. At block 340, the service tool 110 prompts the user that there was an authorization error. The authorization error prompt can be provided through the user interface of the service tool 110.

If the user input is verified, the process flow 300 proceeds to block 350 as shown by the 'Verified' arrow. At block 350, the service tool 110 receives verification confirmation from controller 140. In this regard, the cloud service 130 can independently communicate with the controller 140 to authorize access with respect to the adjuster/construction level by the service tool 110. In this way, the cloud service 130 provides remote service functionality to the controller 140 (and the service tool 110). Once the authorization is complete, the controller 140 sends the verification confirmation to the service tool 110.

At block 360, the service tool 110 of FIG. 1 enables the adjuster/construction level. In this regard, the service tool 110 translates the user input of block 320 into a command and transmits the command to the controller 140. In response, the controller 140 enables the adjuster/construction level.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A service tool comprising:
a transceiver communicatively coupled to a wireless access device physically connected to a mechanical system and to a cloud service to provide security provisions for control of the mechanical system;
a memory storing a service tool application software thereon; and
a processor executing the service tool application software to execute at least one of a plurality of operability support levels by the service tool for the mechanical system,
wherein the plurality of operability support levels comprise at least one of an adjuster/construction level and a field technician level;
the adjuster/construction level providing the security provisions for control of the mechanical system including receipt of a verification confirmation by the service tool based on the cloud service authorizing access with respect to the adjuster/construction level;
wherein the adjuster/construction level comprises one or more of checking drive and group status, performing a remote station link address check, performing a contract and/or default setups, and performing a search of input/outputs;
wherein the field technician level comprises one or more of detecting, monitoring, and analyzing provisions of the mechanical system for an elevator car or escalator direction, an elevator car or escalator position, an up/down status, a load status, an operational mode, and an input/output status.

2. The service tool of claim 1, wherein the security provisions comprise online authentication, dual factor authentication, session management, counter per session, application sign-in, certificates, obfuscation, or mobile device management.

3. The service tool of claim 1, wherein the cloud service provides encoding, multi-level security, counter based access, or time based access functionality to the service tool.

4. The service tool of claim 1, wherein each of the plurality of operability support levels comprise one or more of logging, searching, offline, safety, shortcut, and statistic features.

5. The service tool of claim 1, wherein the security provisions with respect to the adjuster/construction level enable the service tool to provide direct operation checks and advanced operational configuration changes to the mechanical system independent of a proprietary dongle.

6. The service tool of claim 1, wherein the wireless access device is physically and electrically coupled to an interface of the mechanical system, the interface comprising a nine-pin serial port.

7. The service tool of claim 1, wherein the service tool is a smartphone.

8. A system comprising:
a cloud service;
a mechanical system operating and managing an elevator or an escalator;
a wireless access device physically connected to the mechanical system; and
a service tool comprising:
a transceiver communicatively coupled to the wireless access device and to the cloud service to provide security provisions for control of the mechanical system;
a memory storing a service tool application software thereon; and
a processor executing the service tool application software to execute at least one of a plurality of operability support levels by the service tool for the mechanical system,
wherein the plurality of operability support levels comprise at least one of an adjuster/construction level and a field technician level;
the adjuster/construction level providing the security provisions for control of the mechanical system including receipt of a verification confirmation by the service tool based on the cloud service authorizing access with respect to the adjuster/construction level;
wherein the adjuster/construction level comprises one or more of checking drive and group status, performing a remote station link address check, performing a contract and/or default setups, and performing a search of input/outputs;
wherein the field technician level comprises one or more of detecting, monitoring, and analyzing provisions of the mechanical system for an elevator car or escalator direction, an elevator car or escalator position, an up/down status, a load status, an operational mode, and an input/output status.

9. The system of claim 8, wherein the security provisions comprise online authentication, dual factor authentication, session management, counter per session, application sign-in, certificates, obfuscation, or mobile device management.

10. The system of claim 8, wherein the cloud service provides encoding, multi-level security, counter based access, or time based access functionality to the service tool.

11. The system of claim 8, wherein each of the plurality of operability support levels comprise one or more of logging, searching, offline, safety, shortcut, and statistic features.

12. The system of claim 8, wherein the security provisions with respect to the adjuster/construction level enable the service tool to provide direct operation checks and advanced operational configuration changes to the mechanical system independent of a proprietary dongle.

13. The system of claim 8, wherein the wireless access device is physically and electrically coupled to an interface of the mechanical system, the interface comprising a nine-pin serial port.

14. The system of claim 8, wherein the service tool is a smartphone.

* * * * *